Patented Mar. 14, 1950

2,500,222

UNITED STATES PATENT OFFICE 2,500,222

CURABLE ALKYD RESINS

Harold E. Weaver, Pittsburgh, Pa., and Ellis Gray King, Shelton, Wash., assignors to Armstrong Cork Company, Lancaster, Pa., a corporation of Pennsylvania No Drawing. Application October 17, 1946, Serial No. 703,718

9 Claims. (Cl. 260—75)

This invention relates to a process of preparing alkyd resins. More particularly, this invention relates to a process of preparing curable alkyd resins characterized by having a controlled amount of unsaturation in the resin molecule.

An alkyd resin is the reaction product of a polyhydric alcohol and a polycarboxylic acid formed by condensation with the elimination of water. If an acid or alcohol of more than difunctionality is used, carrying the condensation far enough results in the formation of an infusible, insoluble resin. If, however, both the acid and the alcohol are difunctional, continued condensation until no more water can be eliminated will not result in the formation of an infusible, insoluble resin provided none of the reactants contain double bonds. In this type of reaction, there can be no branched chain network formed but only a series of long, straight chains and no chemical bonds between them. If there is included along with the saturated acid and glycol a small amount, such as less than 5%, of an unsaturated acid, and the molecular weight is raised to a sufficiently high value by condensation alone, it is possible to prepare a resin which can be cured to a substantially insoluble, infusible, rubberlike material. It is, however, generally difficult to prepare resins of the required high molecular weight, and excessively long reaction times are frequently required. Many times, moreover, the conditions required for the preparation of these resins, such as extremely low pressures, cannot be readily obtained commercially.

By increasing the ratio of unsaturated to saturated acid in an alkyd resin prepared from dicarboxylic acid and dihydric alcohols considerably above that in the last-mentioned reaction, it is possible to prepare resins which can be cured to an insoluble, infusible condition without the necessity of condensing the acid and alcohol to a very high molecular weight. Resins prepared in this manner are, however, comparatively brittle and have very low tensile strengths.

We have found that by heating a polyester prepared from a dicarboxylic acid and a dihydric alcohol to an elevated temperature, we can prepare a useful, unsaturated polyester. In accordance with our invention, the condensation product of a dihydric alcohol, and a dicarboxylic acid is pyrolyzed at temperatures above 250° C. Under such conditions, we have found that a certain amount of decomposition of the polyester occurs, which decomposition results in the formation of a resin characterized by unsaturation and being readily curable.

In accordance with our invention, the controlled decomposition or pyrolysis results in the controlled formation of unsaturation which we believe arises from the splitting off of acid molecules. The splitting, however, may occur internally as well as at the end of a chain. While we believe that the reaction proceeds by this mechanism, we do not wish to be limited by any theory advanced herein.

In the process of our invention, the esterification of a dihydric alcohol with a dicarboxylic acid may be carried out by any suitable means and generally comprises heating a mixture of the reactants at a suitable temperature, such as 150° to 200° C. until condensation is effected. Generally speaking, condensation of the reactants takes place after heating for a period of one to four hours, depending upon the particular temperature employed. When higher temperatures are utilized, the condensation time is shorter and, on the other hand, when lower temperatures are employed, a longer condensation time may be required.

Following the esterification or condensation of the initial reactants, the resulting material is then subjected to an eletvated temperature for a time sufficient to cause partial decomposition thereof as is evidenced by an increase in iodine number and, in some cases, a reduction in acid number.

The time required for pyrolysis of alkyd resins in accordance with our invention is a direct function of the temperature of pyrolysis. While the temperatures may vary somewhat depending upon the particular dicarboxylic acids and dihydric alcohols employed in the esterification, generally speaking, the temperature is advantageously maintained during pyrolysis at between approximately 250° C. and 300° C. At temperatures below 250° C. no appreciable rate of pyrolysis occurs, whereas at temperatures greater than 300° C. the rate of pyrolysis is so rapid as to be difficultly controllable. In addition, at temperatures greater than 300° C., undesirable side reactions may occur which result in loss of weight by the resin without a proportionate increase in unsaturation. Particularly advantageous results may be obtained by utilizing pyrolysis temperatures in the range of 270° C. to 280° C. At such temperatures, the rate of pyrolysis is sufficiently rapid to be practical but yet slow enough to be controlled satisfactorily.

Under such conditions of temperature, the reaction time is advantageously at least about 5 hours. For instance, excellent results have been obtained by pyrolyzing an alkyd resin at a temperature of about 275° C. for a period of about 6 hours. Longer times of pyrolysis may be employed such as 25 hours. However, when the pyrolysis is conducted for too long a time, the resin may lose weight without improving the desirable properties thereof.

Generally speaking, the conditions of pyrolysis are advantageously sufficiently drastic to produce a modified alkyd resin having an iodine value of at least 4 and advantageously 5 to 10.

A wide variety of dihydric alcohols and dicarboxylic acids may be employed in the preparation of alkyd resins which may be decomposed in accordance with our invention to produce readily curable resins. Those resins obtained by the condensation of saturated dicarboxylic acids having at least 4 carbon atoms in the chain, such as adipic acid, succinic acid, suberic acid, sebacic acid, methyl succinic acid, dimethyl succinic, B-methyl adipic acid, and the like are particularly suitable in the practice of our invention. Anhydrides formed by any of the above-listed acids may also be employed in the preparation of resins which may be decomposed in accordance with our invention. Among the dihydric alcohols which are advantageous for use in the preparation of resins which may be decomposed in accordance with our invention are ethylene glycol, propylene glycol, butylene glycol, polyglycols, such as diethylene glycol, triethylene glycol, and the like. Propylene glycol is a particularly advantageous dihydric alcohol for use in the preparation of curable alkyd resins in accordance with our invention.

While the proportions of the reactants in the condensation or esterification phase of the process may be varied, generally speaking, it is advantageous to employ the reactants in approximately the ratio of mol to mol. For example, the reaction mixture containing 10 mols of glycol and 11 mols of acid produces a resin which is readily decomposed to produce a curable resin in accordance with our invention. Other mol ratios such as 11 mols of glycol with 10 mols of acid and 1 mol of glycol with 1 mol of acid may also be employed. Generally speaking, resins prepared from reaction mixtures containing an excess of either acid or glycol develop unsaturation more rapidly than those containing equivalent quantities of the reactants.

If desired, the process of our invention may be carried out in the presence of a suitable catalyst such as alumina, silica gel, diatomaceous earth, and other adsorbent catalysts. Such catalysts are primarily esterification catalysts and are advantageously used in quantities of from 0.5 to 5%. Particularly advantageous results may be obtained by utilizing from 1 to 3% of catalyst. For instance, excellent results have been obtained by utilizing about 2% by weight of an inorganic oxide such as alumina in the reaction mass. Of course, other quantities of catalyst may be used depending upon the conditions of time, temperature, pressure, and composition.

The process of our invention is advantageously carried out in liquid phase and continuous removal of water of condensation is advantageous. Continuous removal of water of condensation may be advantageously effected by continuously passing xylene through the reaction zone. The xylene acts as an azeotropic distillation agent. Other azeotropic distillation agents may be employed. If desired, vacuum distillation may be employed to remove water of condensation. In addition to water, volatile reaction products of undefined nature are removed to the extent of 10 to 15% of the total weight of the resin.

Our invention may be more readily understood by reference to the following specific examples:

Example 1

A mixture containing 10 mols of adipic acid and 11 mols of propylene glycol was heated for 2 hours from room temperature to 250° C., using a Widmer column to remove the water of condensation. At the end of 2 hours the column was replaced by a trap cooled by Dry Ice and the pressure was lowered to 3 mm. of mercury. The temperature of the resin with 0.5% of alumina added was raised as rapidly as possible to 262° to 268° C., where it was maintained for 6 hours. The resin was tack-free and has good strength and elastic recovery when cured with 4% of Luperco A (24% benzoyl peroxide on $CaSO_4$) and 60% of iron oxide in a closed mold for 35 minutes at 135° C.

Example 2

A mixture containing 1 mol of propylene glycol for each mol of adipic acid was heated for 2 hours from room temperature to 250° C. using a Widmer column to remove the water of condensation. At the end of 2 hours the column was replaced by a trap cooled by Dry Ice and the pressure was lowered to 3 mm. of mercury. The temperature of the resin with 0.5% of alumina added was raised as rapidly as possible to 262° to 268° C., where it was maintained for 6 hours. The final product had an acid number of 24.3 and an iodine value of 9.5. The weight loss exclusive of water was 11.4%. This resin was then cured with 4% of Luperco A and 60% of iron oxide for 35 minutes at 135° C. to obtain a rubber-like resin of good tensile strength.

Example 3

A propylene glycol adipate resin having an acid number of 28.9 and an iodine value of 3.5 was heated for 3 hours at 250° C., at the end of which time the acid number was reduced to 24. The resin was heated a further 6 hours at 250° C. and a product having an acid number of 16.4 and an iodine value of 8.9 was obtained.

Example 4

An alkyd resin prepared by the condensation of propylene glycol and adipic acid having an initial acid number of about 30 was heated at 250° C. for 25 hours in the presence of 0.5% of alumina with the continuous addition of xylene. The resulting resin had an acid number of 3.6 and an iodine value of 6.7. Four per cent of Luperco A and 65% of iron oxide filler were mixed with this resin, and the resulting mixture cured for 30 to 35 minutes at 130° to 140° C. in a closed mold. The product was a strong, highly extensible material. It was much stronger than the normal cured alkyd resins and showed none of their tendency to break when bent double.

Example 5

A modified alkyd resin was prepared by reacting propylene glycol with adipic acid in the presence of 0.5% of powdered alumina with azeotropic distillation at a temperature of 272° to 276° C. for a period of 6 hours while passing 3100 c. c. of xylene through the reaction vessel. Thereafter 280 c. c. of xylene were passed through the vessel for ½ hour. At the end of this time the iodine number was 8.0 and the acid number was 9.4. The product was cured in a closed mold for 30 to 35 minutes at a temperature of 130° to 140° C. in the presence of 4% of Luperco A and 70% of red slate. The resulting product was a tough, strong, highly resilient material.

In lieu of Luperco A recited in the specific examples as a curing catalyst, straight benzoyl peroxide or other organic peroxides such as lauroyl peroxide may be utilized.

In lieu of iron oxide and red slate recited in the specific examples as fillers, any other of the customary fillers such as calcium carbonate, potters flint and the like may be employed.

If desired, iron oxide may be added to the reaction mixture of dicarboxylic acid and glycol to decrease the time required to produce a curable resin.

If desired, small quantities such as up to 5% of monocarboxylic acids such as acetic acid, chloracetic acid, butyric acid, proprionic acid, stearic acid and the like and/or monohydric alcohols such as butyl alcohol, propyl alcohol and the like may be employed in the preparation of alkyd resins which may be subjected to controlled decomposition in accordance with our invention. Under pyrolysis conditions such monocarboxylic acids may be readily split off to cause unsaturation in the resin molecule. The monohydric alcohols may be included to limit the length of the chain if desired.

The modified alkyd resins of our invention are pourable fluids at room temperature. They may be converted to tough, resilient compositions by a relatively short cure without the necessity of confining the resin under pressure. The resulting cured product is a tough, flexible, rubberlike material which is suitable for use as closure liners, gaskets and the like.

Throughout the specification reference has been made to iodine values as indicating the unsaturation obtained in the practice of our invention. These iodine values have been determined according to the method of Von Mikusch & Frazier, Industrial and Engineering Chemistry, Anal. Ed. 13, 782 (1941). Because of the low unsaturation, 2 gram samples of the treated resin have been used. The experimental procedure in determining the iodine values listed above is as follows:

Accurately weigh 2.0 grams of treated alkyd resin and transfer to a clean, dry 500 c. c. iodine flask. Add 10 c. c. of chloroform. After sample has dissolved, add an exact quantity (about 25 c. c.) of 0.32 N. iodine bromide solution from a constant volume pipette, swirl and place in a water bath at 20° C. After one hour, add 20 c. c. of 15% potassium iodide solution, washing stopper and neck, and titrate in the usual manner, using starch indicator at the end point. Blank determinations with 10 c. c. chloroform are carried out in the same manner.

The iodine value is calculated as follows:

$$I.V. = \frac{100(A-B)C}{D}$$

where

A = cc. of sodium thiosulfate used for blank.
B = cc. of sodium thiosulfate used for sample.
C = g. of iodine equivalent to 1 cc. of sodium thiosulfate solution.
D = weight of sample in grams.

While our invention has been described with reference to certain specific examples and with reference to certain particular embodiments, it is to be understood that the invention is not limited thereby. Therefore, changes, omissions, substitutions and/or additions may be made without departing from the scope of the invention as defined in the appended claims, which are intended to be limited only as required by the prior art.

We claim:

1. A process of preparing a curable alkyd resin which comprises heating a saturated polyester condensation product of a mixture composed of a saturated dicarboxylic acid of the group consisting of adipic acid, succinic acid, suberic acid, sebacic acid, methyl succinic acid, dimethyl succinic acid, and B-methyl adipic acid; a saturated dihydric alcohol of the group consisting of ethylene glycol, propylene glycol, butylene glycol, diethylene glycol, and triethylene glycol; and 0% to 5% by weight of a modifier of the group consisting of saturated monocarboxylic acids and saturated monohydric alcohols at a temperature between 250° C. and 300° C. until said polyester exhibits an iodine value of about 4 to 10.

2. The product of the process of claim 1.

3. A process of preparing a curable alkyd resin which comprises condensing approximately 11 mols of propylene glycol with approximately 10 mols of adipic acid as the sole reactants to obtain a saturated polyester condensation product, and heating said condensation product at a temperature between 250° C. and 300° C. until said condensation product possesses an iodine value of about 4 to 10.

4. A process of preparing a curable alkyd resin which comprises condensing a saturated dicarboxylic acid of the group consisting of adipic acid, succinic acid, suberic acid, sebacic acid, methyl succinic acid, dimethyl succinic acid, and B-methyl adipic acid with a saturated dihydric alcohol of the group consisting of ethylene glycol, propylene glycol, butylene glycol, diethylene glycol, and triethylene glycol as the sole reactants in the presence of an adsorbent catalyst, and heating the resulting saturated condensation product to a temperature between 250° C. and 300° C. to produce a product having an iodine value of about 5 to 10.

5. A process of preparing a curable alkyd resin which comprises condensing a saturated dicarboxylic acid of the group consisting of adipic acid, succinic acid, suberic acid, sebacic acid, methyl succinic acid, dimethyl succinic acid, and B-methyl adipic acid with a saturated dihydric alcohol of the group consisting of ethylene glycol, propylene glycol, butylene glycol, diethylene glycol, and triethylene glycol as the sole reactants in the presence of alumina, and heating the resulting saturated condensation product to a temperature between 250° C. and 300° C. to produce a product having an iodine value of about 5 to 10.

6. A process of preparing a curable alkyd resin which comprises condensing a saturated dicarboxylic acid of the group consisting of adipic acid, succinic acid, suberic acid, sebacic acid, methyl succinic acid, dimethyl succinic acid, and B-methyl adipic acid with a saturated dihydric alcohol of the group consisting of ethylene glycol, propylene glycol, butylene glycol, diethylene glycol, and triethylene glycol as the sole reactants in the presence of silica gel, and heating the resulting saturated condensation product to a temperature between 250° C. and 300° C. to produce a product having an iodine value of about 5 to 10.

7. A process of preparing a rubberlike alkyd resin which comprises reacting a saturated dicarboxylic acid of the group consisting of adipic acid, succinic acid, suberic acid, sebacic acid, methyl succinic acid, dimethyl succinic acid, and B-methyl adipic acid with a saturated dihydric alcohol of the group consisting of ethylene glycol, propylene glycol, butylene glycol, diethylene glycol, and triethylene glycol as the sole reactants to obtain a saturated polyester condensation product, heating said condensation product between 250° C. and 300° C. until said product obtains an iodine value of between about 4 and 10, and thereafter heating the resulting unsaturated resin at a temperature of approximately 135° C. to 140° C. to obtain a rubberlike product.

8. The product of the process of claim 7.

9. A process of preparing a rubberlike alkyd resin which comprises reacting approximately 1 mol of a saturated dicarboxylic acid of the group consisting of adipic acid, succinic acid, suberic acid, sebacic acid, methyl succinic acid, dimethyl succinic acid, and B-methyl adipic acid with approximately 1 mol of a saturated dihydric alcohol of the group consisting of ethylene glycol, propylene glycol, butylene glycol, diethylene glycol, and triethylene glycol as the sole reactants in the presence of an esterification catalyst to obtain a saturated polyester condensation product while continuously removing water of condensation, heating said condensation product between 250° C. and 350° C. for a period of time of at least 5 hours, and thereafter heating the resulting unsaturated resin at approximately 130° C. to 145° C. in the presence of an organic peroxide to obtain a rubberlike product.

HAROLD E. WEAVER.
ELLIS GRAY KING.

REFERENCES CITED

The following references are of record in the file of this patent:

UNITED STATES PATENTS

| Number | Name | Date |
|---|---|---|
| 1,851,405 | Rosenstein et al. | Mar. 29, 1932 |
| 2,071,250 | Carothers | Feb. 16, 1937 |
| 2,322,756 | Wallder | June 29, 1943 |

OTHER REFERENCES

Carothers, Collected Papers on High Polymers, pub. by Interscience Publishers Inc., New York, pages 24, 54–55.